United States Patent
Duncan et al.

(10) Patent No.: US 9,494,416 B2
(45) Date of Patent: Nov. 15, 2016

(54) FIBER OPTIC SHAPE SENSING SYSTEM USING ANCHORING POINTS

(71) Applicants: Roger Glen Duncan, Christiansburg, VA (US); Matthew Thomas Raum, Blacksburg, VA (US); Christopher H. Lambert, Blacksburg, VA (US)

(72) Inventors: Roger Glen Duncan, Christiansburg, VA (US); Matthew Thomas Raum, Blacksburg, VA (US); Christopher H. Lambert, Blacksburg, VA (US)

(73) Assignee: BAKER HUGHES INCORPORATED, Houston, TX (US)

( * ) Notice: Subject to any disclaimer, the term of this patent is extended or adjusted under 35 U.S.C. 154(b) by 135 days.

(21) Appl. No.: 14/174,055

(22) Filed: Feb. 6, 2014

(65) Prior Publication Data

US 2015/0219445 A1 Aug. 6, 2015

(51) Int. Cl.
*G01J 1/04* (2006.01)
*G01B 11/16* (2006.01)
*E21B 47/00* (2012.01)
*E21B 47/12* (2012.01)

(52) U.S. Cl.
CPC ........... *G01B 11/18* (2013.01); *E21B 47/0002* (2013.01); *E21B 47/123* (2013.01)

(58) Field of Classification Search
CPC ............................... G01B 11/16; G01B 11/24
USPC ......................................... 385/13; 250/227.14
See application file for complete search history.

(56) References Cited

U.S. PATENT DOCUMENTS

| 6,233,373 | B1 | 5/2001 | Askins et al. |
|---|---|---|---|
| 2007/0051882 | A1 | 3/2007 | Childers |
| 2008/0285909 | A1* | 11/2008 | Younge et al. ................. 385/13 |
| 2011/0109898 | A1 | 5/2011 | Froggatt et al. |
| 2011/0181871 | A1 | 7/2011 | Childers et al. |
| 2012/0143522 | A1* | 6/2012 | Chen ..................... G01L 1/2281 702/42 |

FOREIGN PATENT DOCUMENTS

WO 2008131303 A2 10/2008

OTHER PUBLICATIONS

Klute et al., "Fiber-Optic Shape Sensing and Distributed Strain Measurements on a Morphing Chevron"; American Institute of Aeronautics and Astronautics, Jan. 9, 2006; 23 pages.
Notification of Transmittal of the International Search Report and the Written Opinion of the International Searching Authority; PCT/US2015/010035; Korean Intellectual Property Office; Mailed Apr. 20, 2015; 12 pages.

* cited by examiner

*Primary Examiner* — Thanh Luu
(74) *Attorney, Agent, or Firm* — Cantor Colburn LLP

(57) ABSTRACT

Disclosed herein is a method for sensing one or more selected parameters related to a structure of interest, for example, the shape of an isolated structure. A cable is attached to the structure of interest at one or more attachment points. The cable contains one or more optical fibers. One or more light signals are transmitted into the one or more optical fibers and then detected to form a data set. The data set is compared with information known about the one or more attachment points to determine error values. The error values are then combined with the data set to determine the selected parameters associated with the structure.

11 Claims, 1 Drawing Sheet

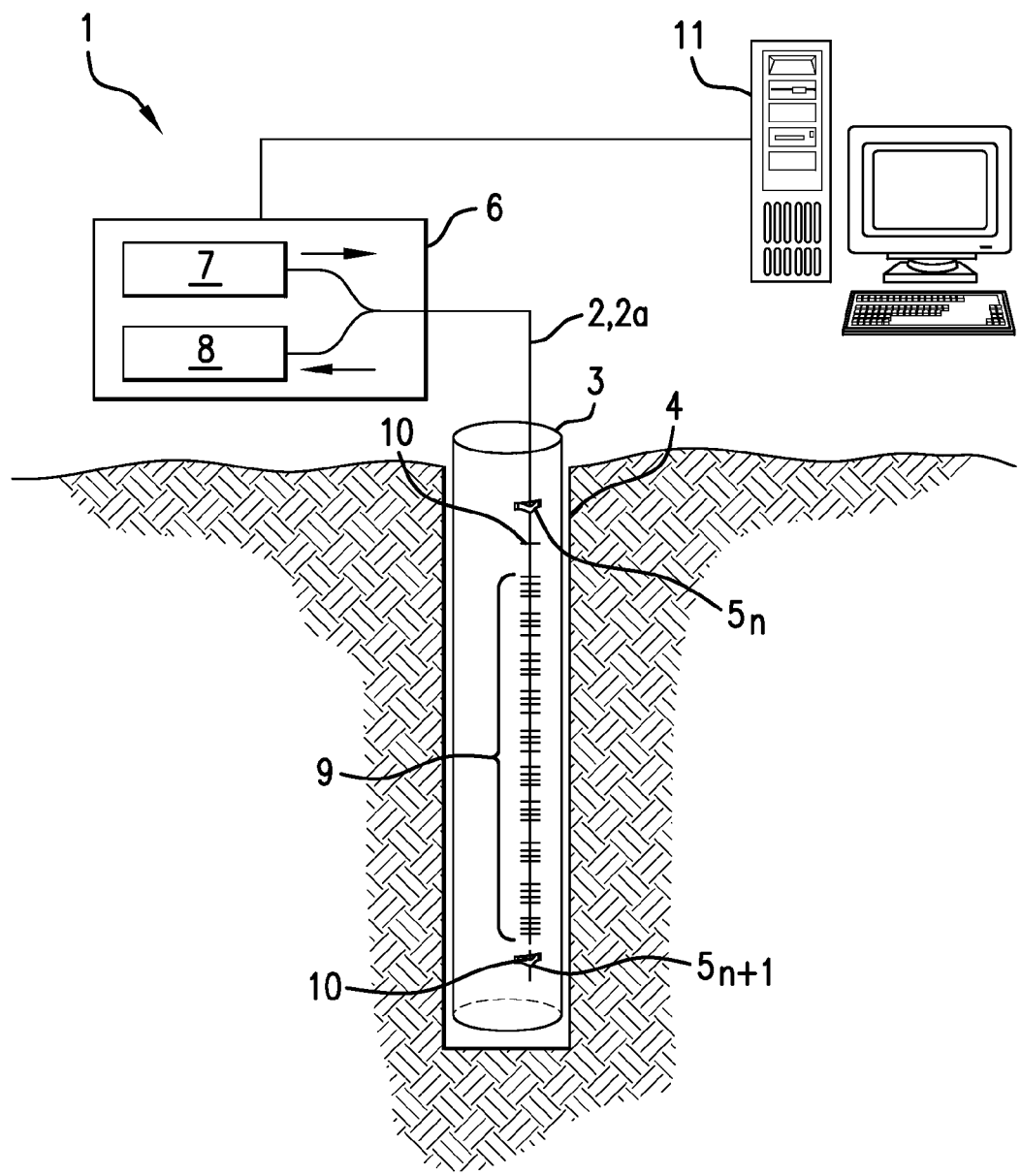

FIBER OPTIC SHAPE SENSING SYSTEM USING ANCHORING POINTS

BACKGROUND

In various aspects of sub surface activities such as hydrocarbon exploration and production, Carbon Dioxide sequestration, etc. one or more fiber optic cables having one or more optical sensors formed therein or connected thereto may be employed to obtain information from downhole locations. For example, by embedding or attaching a fiber optic cable to a structure, one can monitor the dynamic shape or relative position of the structure independently from temperature or load effects. As the fiber optic cable bends and/or stretches, the optical path of radiation propagating through the fiber is changed. Information pertaining to the shape of the structure is manifest in the phase of radiation propagating within the fiber and is therefore extractable using interferometric techniques. Several factors, however, can affect the reliability of such measurements. For example, the shape of the structure is calculated by comparing the measured waveform and an earlier, "zero-strain" waveform, and may not account for localized effects such as twisting. Because the reliability of shape information regarding inaccessible structures, such as a borehole, is crucial to maintenance and operation, the industry is receptive to advancements in measurement systems and methods.

SUMMARY

Disclosed herein is a method for monitoring an isolated structure that includes transmitting one or more light signals into one or more optical fibers that are coupled to the isolated structure at one or more attachment points. The one or more light signals are detected and then processed to form a data set. The data set is then compared with the one or more attachment points to estimate error values associated with each of the one or more attachment points. These error values are combined with the data set to determine one or more selected parameters.

Also disclosed herein is a method for sensing the shape of a structure of interest, comprising attaching a cable to a structure of interest at one or more attachment points. The cable contains one or more optical fibers. The location of each of the one or more attachment points is then recorded. One or more light signals are transmitted into the one or more optical fibers and then detected. An estimated shape of the structure of interest is determined by processing the one or more light signals. The data set is then compared with the one or more attachment points to estimate error values associated with each of the one or more attachment points. These error values are combined with the data set to determine one or more selected parameters.

BRIEF DESCRIPTION OF THE DRAWINGS

The following descriptions should not be considered limiting in any way. With reference to the accompanying drawings, like elements are numbered alike:

FIG. 1 is a schematic of a shape sensing system according to one embodiment.

DETAILED DESCRIPTION

A detailed description of one or more embodiments of the disclosed apparatus, system and associated method are presented herein by way of exemplification and not limitation with reference to the Figures. It is to be understood that other embodiments may be utilized and changes may be made without departing from the scope of the present disclosure. In particular, the disclosure provides various examples related to a shape sensing system for use in downhole operations, whereas the advantages of the present disclosure as applied in a related field would be apparent to one having ordinary skill in the art and are considered to be within the scope of the present invention.

The present disclosure provides a shape sensing system for estimating or determining the shape of a structure of interest, such as an isolated structure. As used herein, the term "isolated structure" refers to a structure or structural element that is visibly located or otherwise accessible so that the shape of the structure might be determined by another method, such as photogrammetry.

FIG. 1 illustrates one embodiment of a shape sensing system 1 employed in a downhole environment, comprising one or more cables 2, each containing one or more optical fibers 2a disposed with a tubular 3 in a borehole 4 penetrating the earth. The tubular 3 may represent a casing or other tubing used for downhole operations such as for hydrocarbon production purposes, but may also represent any equipment or structure that may be monitored by the shape sensing system 1. The cable 2 is attached to the tubular 3 at a number of attachment points 5 ($5_n$, $5_{n+1}$). These attachment points 5 may comprise a clamp or other fastening configuration or fastener for securing the cable to the tubular 3 or another structure. As further discussed below, the location of attachment points is used to increase the accuracy of the selected parameters.

The shape sensing system 1 of FIG. 1 comprises an optical interrogator 6 that is configured to obtain measurement data from the optical fibers 2a disposed in the cable 2. The optical interrogator includes a light source 7, such as a tunable laser, and a photodetector 8. The light source 7 of FIG. 1 is configured to transmit light signals at a plurality of wavelengths into the one or more optical fibers 2a, which may contain one or more fiber bragg gratings 9 associated with one or more wavelengths. One or more reference reflectors 10 are situated to form an optical cavity with individual fiber bragg gratings 9. Alternatively, the shape sensing system 1 may be deployed without fiber bragg gratings 9, and use another method to interpret optical data, such as by measuring Rayleigh scatter signature.

The one or more light signals transmitted by the light source 7 into the optical fibers 2a are detected by the photodetector 8 or another sensor. The photodetector 8 is configured to receive and measure the light reflected from the optical fibers 2a at the various wavelengths and associated magnitudes. The information received by the photodetector 8 is then interpreted, for example, by a central processing unit 11, to form an interferogram from the various interferences of light from the various optical cavities. The interferogram is a record of the light interferences, with each light interference having a reflection wavelength and a magnitude of the reflected light. Alternatively, the interferogram may be created by a processor contained in the optical interrogator 6. Temperature effects are addressed using temperature sensing, such as by a distributed temperature sensor contained in the same cable or another cable or conduit.

The information contained by the interferogram is then processed to correlate to a data set representing a selected parameter, such as strain or shape. For example, central processing unit 11 interpolates positional data along the region of interest by inferring a local bend at a particular fiber bragg grating $9_k$. The position of this fiber bragg grating $9_k$ is thus determined by integrating the contributions of the preceding fiber bragg gratings $9_{k-1}, 9_{k-2}, \ldots, 9_1$. The error in the calculated position of the fiber bragg grating $9_k$ is the integral of the errors between actual and calculated position of the preceding fiber bragg gratings.

The system and method of the present disclosure compares data about the known location of individual attachment points $5_n$, $5_{n+1}$ with the data set processed from the interferogram to increase the accuracy of the calculation. The location of attachment points $5_n$, $5_{n+1}$ may be recorded as a relative position or as a function of a distance along the cable 2 from the optical interrogator 6 or another reference point. In some instances, such as where the tubular 3 is in compression or tension, segments of the cable 2 may experience localized phenomena, such as buckling, twisting, or other torsional effects. As a result, absolute strain measurements are elevated locally at attachment points. These induced torsional effects can be compensated by using the locations of attachment points $5_n$, $5_{n+1}$ as constraints when processing the interferogram to estimate an error value at each of the one or more attachment points, which can then be used to correct the data set, providing the selected parameters with greater accuracy along the length of the fiber. The error values discussed herein may be determined by comparing the data set with the known position and orientation of the one or more attachment points 5, by reviewing the data set for abnormal data corresponding to the one or more attachment points 5 that would indicate an induced torsion value, by some combination of these methods, or by other methods where the error value may be at least partially determined by empirical methods.

The features of the present disclosure may be useful in a wide variety of embodiments, in addition to the alternatives disclosed above. In one embodiment, the system may be employed with a remotely operated tool deployed at an isolated location. In various embodiments, the cable may be attached to a structure of interest using clamps or other fasteners or adhesives. In one embodiment, one or more of the fiber bragg gratings may be arranged at an attachment point.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc., do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A method for monitoring a downhole tubular defining a tubular axis comprising:
    transmitting one or more light signals into one or more optical fibers coupled to the downhole tubular at one or more attachment points, the one or more optical fibers extending substantially linearly along the downhole tubular;
    detecting and processing, through a central processor, the one or more light signals to form a data set;
    determine an induced torsional value of the one or more optical fibers at one of the one or more attachment points;
    comparing, through the central processor, the data set with predetermined location data describing the one or more attachment points to estimate one or more error values associated with the induced torsional value of the one or more optical fibers at the one of the one or more attachment points; and
    combining the data set and the one or more error values to determine one or more selected parameters of the downhole tubular.

2. The method of claim 1, wherein the one or more selected parameters comprises one of shape data and strain data.

3. The method of claim 1, wherein comparing the data set with the predetermined location data describing the one or more attachment points comprises using a known location and orientation of the attachment points.

4. The method of claim 1, wherein comparing the data set with the predetermined location data describing the one or more attachment points comprises searching for abnormal data associated with the induced torsional value of the one or more optical fibers at the one or more attachment points.

5. The method of claim 1, further comprising:
    determining a temperature at the downhole tubular; and
    compensating, in the processor, for temperature effects on the one or more optical fibers.

6. A method for estimating a shape of a downhole tubular defining a tubular axis comprising:
    attaching a cable to the downhole tubular at one or more attachment points, the cable extending substantially linearly along the downhole tubular, the cable containing one or more optical fibers;
    recording a location of each of the one or more attachment points;
    transmitting one or more light signals into the one or more optical fibers;
    detecting, through a central processor, the one or more light signals;
    processing, through the central processor, the one or more light signals to form a data set;
    determining an induced torsional value of the one or more optical fibers at one of the one or more attachment points;
    comparing, through the processor, the data set and the location of each of the one or more attachment points to estimate an error value associated with the inducted torsional value of the one or more optical fibers at each of the one or more attachment points; and
    combining the data set and the error value at each of the one or more attachment points to determine one or more selected parameters of the downhole tubular.

7. The method of claim 6, wherein processing, through the processor, the one or more light signals further comprises correcting for the induced torsion value of the one or more optical fibers.

8. The method of claim 6, wherein the selected parameter comprises one of shape data and strain data.

9. The method of claim 6, wherein comparing, through the processor, the data set with the location of each of the one or more attachment points comprises using a known location and orientation of the attachment points.

10. The method of claim 6, wherein comparing, through the processor, the data set with the location of each of the one or more attachment points comprises searching for abnormal data associated with the induced torsional value of the one or more optical fibers at the one or more attachment points.

11. The method of claim 6, further comprising:
    determining a temperature at the downhole tubular; and
    compensating, in the processor, for temperature effects on the one or more optical fibers.

* * * * *